US006779547B1

(12) United States Patent
Bowers

(10) Patent No.: US 6,779,547 B1
(45) Date of Patent: Aug. 24, 2004

(54) AUTOMATED CONDENSATION DRAIN SYSTEM

(76) Inventor: James R. Bowers, 1453 Mars Ave., Lakewood, OH (US) 44107

( * ) Notice: Subject to any disclaimer, the term of this patent is extended or adjusted under 35 U.S.C. 154(b) by 0 days.

(21) Appl. No.: 10/667,836

(22) Filed: Sep. 23, 2003

(51) Int. Cl.$^7$ .............................................. F16K 24/00
(52) U.S. Cl. ...................................... 137/204; 137/557
(58) Field of Search ................................. 137/204, 557

(56) References Cited

U.S. PATENT DOCUMENTS 6,196,253 B1 * 3/2001 Love .......................... 137/204

* cited by examiner

Primary Examiner—Gerald A. Michalsky

(74) Attorney, Agent, or Firm—John D. Gugliotta; Olen L. York, III

(57) ABSTRACT

An automated condensate drain system for gas flow elements is provided that includes a differential pressure transmitter, a sequence controller, and two condensate chambers for receiving and collecting accumulated moisture from air flow elements and transmitters. The condensate chambers are placed in low profile positions within the instrument piping system, requiring downward sloping of the instrument tubing to accentuate condensation drainage. The sequence controller initiates a drainage cycle (set as desired by operator), permitting the transmitter to enter an auto-zero cycle, thereby energizing an internal isolation valve in the transmitter while maintaining the transmitter output. The sequence controller energizes solenoid valves of the two condensate chambers, wherein the chambers open to permit drainage of accumulated moisture assisted by static pressure system. After the drainage cycle is completed, the sequence controller de-energizes solenoid valves and returns the drain valves to a closed position and the transmitter returns to normal operation.

5 Claims, 1 Drawing Sheet

AUTOMATED CONDENSATION DRAIN SYSTEM

RELATED APPLICATIONS

There are no previously filed, nor currently any co-pending applications, anywhere in the world.

BACKGROUND OF THE INVENTION

1. Field of the Invention

The present invention is related generally to a drain system, and more particular, to an automated condensation drain system integrated with the air flow elements and transmitters of an air or gas flow measurement system.

2. Description of the Related Art

The Pitot tube is an accepted and useful tool for measuring the flow rate of gas passing through piping or ducts in a forced air furnace network. Generally, Pitot tubes are slender, linearly elongated tubes having at least one, but often a plurality of, orifices provided for detecting flow. The Pitot tube does not significantly interfere or interrupt flow, thus the orifices can capture samples of flow velocity at various points within the piping or duct as desired and not disturb the operation of the system.

Of particular note, U.S. Pat. No. 6,289,745 and U.S. Pat. No. 6,401,555, each issued in the name of Bowers, a co-inventor on the present invention, disclose information pertinent to the present invention. The Bowers patents disclose various apparatuses for use with air flow sensing elements. However, one particular problem that arises in moist air flow applications is the accumulation of condensation in the components and interconnecting tubing. Accumulated moisture may impair measurement accuracy and/or damage the measuring instrument, resulting in expensive repairs, replacement and irreplaceable downtime of the network.

Consequently, a need has arisen for a solution to the aforementioned problems, and includes providing an automated condensation drain system for purging interconnecting instrument tubing of accumulated moisture.

SUMMARY OF THE INVENTION

Briefly described according to one embodiment of the present invention, an automated condensate drain system for gas flow elements includes a differential pressure transmitter, a sequence controller, and two condensate chambers for receiving and collecting accumulated moisture from air flow elements and transmitters. The condensate chambers are placed in low profile positions within the instrument piping system, requiring downward sloping of the instrument tubing to accentuate condensation drainage. The sequence controller initiates a drainage cycle (set as desired by operator), permitting the transmitter to enter an auto-zero cycle, thereby energizing an internal isolation valve in the transmitter while maintaining the transmitter output. The sequence controller energizes solenoid valves of the two condensate chambers, wherein the chambers open to permit drainage of accumulated moisture assisted by static pressure in the system. After the drainage cycle is completed, the sequence controller de-energizes solenoid valves and returns the drain valves to a closed position and the transmitter returns to normal operation.

It is an object of the present invention to provide an automated system for draining accumulated condensation from a gas measurement system.

It is a feature of the present invention to provide an automated condensation drainage system including two condensation chambers with automated drain valves for purging an instrument line of accumulated condensation, wherein one condensation chamber is connected with the total pressure line and a second condensation chamber is connected with the static pressure line.

It is a further feature of the present invention to provide an automated condensation drainage system including a sequence controller to regulate the condensation drain cycle frequency and duration, signaling automated valves to open and/or close as required for drainage or storage.

It is yet a further feature of the present invention to provide an automated condensation drainage system including a differential pressure transmitter for measuring local air flow velocity and for interacting with the sequence controller to properly coordinate drainage and normal operation therebetween.

The use of the present invention provides a mechanism for purging excess condensation from the instrument tubing, thereby preventing damage to the instrumentation and components, and for ensuring accurate measurements of fluid flow.

An advantage of the present invention is that it is specifically adapted for use with air flow measurement systems, and is inexpensively manufactured and obtained. The present invention further provides a mechanism for easily maintaining the proper operation of air flow measuring devices without the intrusiveness of manual disassembly and purging.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
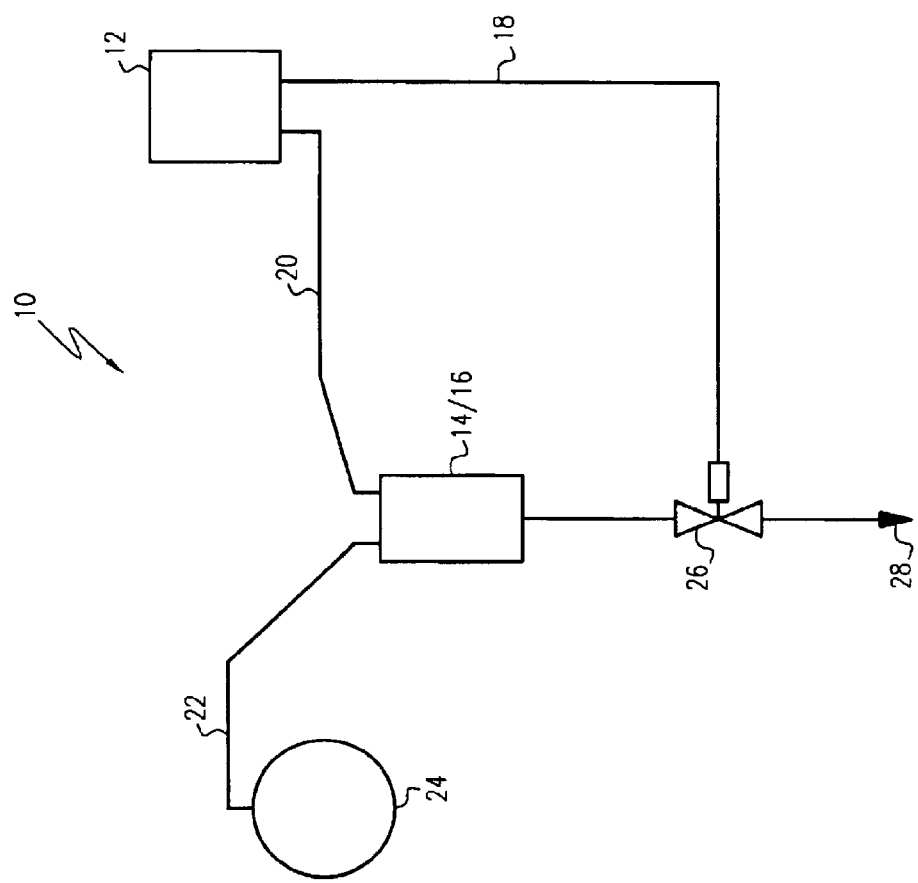
FIG. 1 is a plan view of an automated condensation drainage system for use with Pitot tubes in an air flow measurement system.

The best mode for carrying out the invention is presented in terms of its preferred embodiment, herein depicted within the FIG. 1.

1. Detailed Description of the Figures

Referring now to FIG. 1, an automated condensation drainage system 10 is shown in accordance with the preferred embodiment of the present invention. The system 10 comprises a transmitter with a sequence controller 12 electronically wired with two condensation chambers 14 and 16, communicating via signal 18, and corresponding condensation drain lines 20. The system 10 further comprises condensation drain lines 22 from flow element 24 to condensation chambers 14 and 16. Each condensation chamber 14 and 16 includes a drain valve 26 that leads to a drain 28 for purging of excess condensation within an instrument tubing system.

The system 10 is incorporated into the piping network of an air flow measurement system, as a mechanism for automatically purging excess condensation from the instrument tubing of the network. The chambers 14 and/or 16 are arranged in a lower profile position in relation to the transmitter and sequence controller 12 and the flow element 24, respectively, and the forced air piping network in general. This results in condensation drain lines 20 and 22, respectively, pitched at a declined or downward attitude toward the chambers 14 or 16. The declined attitude of lines 20 and/or 22 drains excess condensation from the network by gravitational forces acting upon the condensation.

Each chamber 14 and 16 provided in the system 10 includes a solenoid-operated drain valve opened and closed by signal 18 generated from the transmitter and sequence controller 12. The drain cycle is pre-selected by the operator to drain the excess condensation at specified intervals, wherein the sequence controller energizes the solenoid valve to open, and the condensation drains therethrough by gravity and assisted by the system static pressure into the drain 28. At the end of the cycle, the sequence controller de-energizes the solenoid, closing the valve.

In a preferred embodiment of the present invention, it is envisioned that there are two areas of differing relative pressures, a high pressure concentration and a low pressure concentration, respectively, with respect to the transmitter and sequence controller 12 and the flow element 24, respectively. Thus, the transmitter and sequence controller 12 and the flow element 24 each have a high pressure concentration and a low pressure concentration. Therefore, the high pressure concentrations are coupled to one chamber 14 or 16 and the low pressure concentrations are coupled to the second chamber 14 or 16. For sake of clarity, it is assumed that FIG. 1 depicts only one of the pressure concentrations and serves as a representative model of the other pressure concentration. The pressure concentration of transmitter and sequence controller 12 and flow element 24 are coupled to chamber 14 or 16 via condensation drain lines 20 and 22, respectively, and coupled to the top portion of the chamber 14 or 16. The automated valve is positioned in the lower portion of the chamber 14 or 16 to facilitate drainage of the excess condensation.

2. Operation of the Preferred Embodiment

To use the system 10, a user will install the chambers 14 and 16 within an air flow measurement system so that a high pressure connection is made between transmitter and sequence controller 12 and chamber 14 and a second high pressure connection is made between flow element 24 and chamber 14. A low pressure connection is made between transmitter and sequence controller 12 and chamber 16 and a second high pressure connection is made between flow element 24 and chamber 16. Thus, two separate pressure connections are made between the transmitter and sequence controller 12, the flow element 24 and the respective chambers 14 and 16. The user will set the system 10 to automatically purge/drain the instrument piping of excess condensation at periodic intervals as may be required.

The sequence controller initiates a drain cycle in accordance with the interval settings input by the user/operator. Upon drain cycle initiation, the transmitter enters an auto-zero cycle, and energizes the internal isolation valve within the transmitter and also maintaining transmitter output simultaneously. The sequence controller then energizes the respective solenoid-operated drain valves on chambers 14 and 16 so that each valve opens and permits the excess condensation to drain therethrough and into drain 28. After the drainage cycle is complete, the sequence controller de-energizes the solenoid-operated drain valves to close. An approximate fifteen (15) second delay is input to permit stabilization of the pressure sensing instruments. Thereafter, the transmitter is returned to normal operation within the flow measurement system.

As designed, a device embodying the teachings of the present invention is easily applied. The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. An automated condensation drainage system incorporated into the piping network of an air flow measurement system as a mechanism for automatically purging excess condensation from the instrument tubing of a network, said system comprising:

a transmitter with a sequence controller electronically wired with two condensation chambers communicating via a signal;

condensation drain lines in fluid communication with each said condensation chamber;

a drain valve connected to each said condensation drain line that leads to a drain for purging of excess condensation within said instrument tubing system.

2. The automated condensation drainage system of claim 1, wherein said condensation chamber is arranged in a lower profile position in relation to the transmitter and sequence controller, respectively.

3. The automated condensation drainage system of claim 1, further comprising an automated drain valve controlling each said chamber in the system, said automated drain valve opened and closed by signal generated from the transmitter and sequence controller.

4. The automated condensation drainage system of claim 3, wherein said automated drain valve comprises a solenoid valve.

5. The automated condensation drainage system of claim 3, wherein a drain cycle can be pre-selected to drain the excess condensation at specified intervals, wherein the sequence controller energizes the automated valve to open, and the condensation drains therethrough by gravity and assisted by the system static pressure into the drain.

* * * * *